3,226,376
EMULSION POLYMERIZATION OF BUTADIENE HYDROCARBONS BY MEANS OF A DIVALENT COBALT SALT OF BETA-DIKETONES
Homer P. Smith, Little Falls, N.J., assignor to United States Rubber Company, New York, N.Y., a corporation of New Jersey
No Drawing. Filed Jan. 18, 1962, Ser. No. 167,158
12 Claims. (Cl. 260—94.3)

This invention relates to a method of polymerizing in aqueous emulsion 1,3-butadiene and mixtures of 1,3-butadiene with compounds copolymerizable therewith to obtain rubbery polymers having in the diene portion of the molecular chain a relatively high proportion of cis-1,4 configuration.

The techniques of conventional emulsion polymerization are well known in the art and are adequately described in Emulsion Polymerization, F. A. Bovey, I. M. Kolthoff, A. I. Medalia, E. J. Meehan, High Polymers, volume IX, Interscience Publishers, Inc., New York, 1955.

In conventional emulsion polymerization of 1,3-butadiene it is well known that the percentage of cis oriented monomer units in the polybutadiene polymer chain is highly dependent on the temperature of polymerization in the range of from −20° C. to 80° C. Data indicating such well known effect can be found in Synthetic Rubber, G. S. Whitby, John Wiley & Sons, New York, 1954, pages 342–344, and in Medalia and Freeman, JACS 75, 4790 (1953).

The effect of polymerizing temperature on the percentages of cis(cis-1,4 addition), trans(trans-1,4 addition) and vinyl(1,2 addition) structure found in polybutadiene polymerized by conventional aqueous emulsion polymerization methods is indicated by the following table, the data for which was obtained by the analytical methods hereinafter to be described.

| Polymerization temperature, °C. | Percent cis | Structure, percent vinyl | Percent trans |
|---|---|---|---|
| −20 | 4 | 15 | 81 |
| +5 | 8 | 15.5 | 76.5 |
| +50 | 15 | 18 | 67 |
| +80 | 18 | 18 | 64 |

From this table it can be seen that the percentage of cis structure increases from about 4% at a polymerizing temperature of −20° C. to 18% at 80° C. The proportion of vinyl structure is nearly constant, varying only from 15% at −20° C. to 18% at 80° C. The percentage of trans structure decreases as the percentage of cis and vinyl structures increase. These values agree substantially with those of Whitby op. cit. and of Medalia and Freeman op. cit.

A similar effect of temperature on the structure of the diene portion of copolymers of butadiene and styrene and copolymers of butadiene and other ethylenically unsaturated monomers copolymerizable with butadiene is also known. See Whitby op. cit., Bovey et al., op, cit., and Foster and Binder, JACS 75, p. 2910 (1953).

It is also well known in the art to prepare substantially 100% cis and 100% trans polybutadiene by polymerizing in an inert solvent in the presence of catalysts such as alkali metal catalysts or Ziegler catalysts. It is also possible with alkali metal initiation or with Alfin catalysts to prepare polybutadiene with as much as 80% of the monomer units in a vinyl configuration. The neraly 100% cis polybutadiene prepared by the first-mentioned solvent methods has been found to be a polymer of low hysteresis in compounds such as gum stock and carcass stock. The nearly 100% trans polybutadiene has been found to be a crystalline resinous product similar to balata. Polybutadienes of high cis content containing small amounts of trans structure have outstanding freeze characteristics. However the above mentioned processes for producing high cis content suffer certain disadvantages in that they require a monomermer of exceptional purity, solvent media of similar high purity, and catalysts prepared in the absence of air and/or water. In addition before and during the reaction step of these methods precautions must be taken to remove and exclude air and water from the equipment used and from the reaction zone. Otherwise the reaction will stop or proceed slowly. Furthermore, the polymer is obtained in a rather dilute solution contaminated by catalyst residues at the end of the reaction, requiring difficult and costly removal of both the solvent and catalyst residues from the product polymer before it is in useable form. It would be highly advantageous if polybutadiene having a high cis content, and therefore having good low temperature characteristics and low hysteresis, could be prepared by conventional emulsion polymerization, a process not having the disadvantages above mentioned.

It is further generally known that the quality of butadiene emulsion polymers and copolymers of butadiene with such comonomers as styrene and acrylonitrile is improved by polymerizing at low temperatures, that is, temperatures in the range of 0 to 10° C. Such "cold rubbers" made at about 5° C. are more suitable for tire treads than are similar rubbers made at 50° C. This has been attributed to the suppression of branching at low temperatures. It is also easier to obtain high molecular weight polymer or copolymer free from gel by polymerizing at such low temperatures. In addition, the low temperature polymers process better than those made at 50° C. However, since in conventional emulsion polymerization techniques the cis content depends on temperature of polymerization as indicated above, the "cold rubbers" contain less cis structure than those made at higher temperatures, and consequently suffer the disadvantage of low cis structure, that is, poorer freeze resistance. It would be advantageous to prepare such cold rubbers having a cis content higher than is found in the product of conventional emulsion polymerization at low temperatures. Such rubbers would have the advantages of less branching, higher molecular weight, and better processing associated with "cold rubbers," and the advantages of better low temperature characteristics and low hysteresis associated with high cis content.

It is an object of this invention to provide a process whereby the percentage of cis oriented butadiene monomer units in the molecular chain of polybutadiene or in the diene portion of the molecular chain of copolymers of 1,3-butadiene and monoolefins containing a $CH_2=C<$ group prepared by aqueous emulsion polymerization is higher than is found in products prepared at the same temperature by conventional aqueous emulsion polymerization. It is another object of this invention to provide additives for aqueous emulsion polymerization of butadiene and copolymerization of 1,3-butadiene and monoolefins containing a $CH_2=C<$ group, which additives act to control the cis structure in the diene portion of the molecular chain of such polymers so that the molecular chain contains from 17 to 20% of cis oriented monomer units nearly independent of polymerization temperature over the range of from 0° C. to 50° C. It is a further object of this invention to provide polybutadiene and copolymers of butadiene-1,3 and monoolefins containing a $CH_2=C<$ group polymreized in aqueous emulsion at temperatures ranging from 0° C.

to 50° C. which have from 17% to 20% of the monomer units in the diene portion of the molecular chain of such polymers in a cis oriented configuration.

According to this invention I have found that the addition of small amount of divalent cobalt salts of certain beta-diketones to the emulsion polymerization reaction mixtures conventionally used for polymerizing butadiene and mixtures of 1,3-butadiene and monoolefins containing a $CH_2=C<$ group results in polymers wherein about 20% of the butadiene monomer units in the molecular chain of polybutadiene or in the diene portion of the molecular chain of said copolymers is in a cis oriented configuration over the entire range of polymerizing temperatures from 0° C. to 50° C. The beta-diketones whose divalent cobalt salts are effective in the present invention have the formula $$R-\underset{\underset{O}{\|}}{C}-CH_2-\underset{\underset{O}{\|}}{C}-R'$$

in which R and R' are selected from the group consisting of saturated aliphatic, aromatic, alkaryl, and aralkyl hydrocarbon radicals.

The additives which I use in my invention have the property of increasing the proportion of cis structure in polybutadiene and in the diene portion of the molecular chain of copolymers of 1,3-butadiene and monoolefins containing a $CH_2=C<$ group made by emulsion polymerization over that which would normally be found in such polymers made by the same technique at the same temperature without my additive. My additive does not substantially affect the proportion of vinyl structure so that the increase in cis structure results in a corresponding decrease in trans structure.

The maximum percentage of cis structure obtainable with my additives is nearly independent of the temperature of polymerization having values between 17 and 20% over the range from 0° C. to 80° C. It should be noted that the effect of my additives in increasing cis structure is not additional to the effect of temperature alone on structure as described above. For this reason at temperatures above 80° C. the additives of this invention do not produce any noticeable increase in cis structure over that due to temperature alone which above 80° C. results in polymers having a cis structure greater than 20%. So, while there is no upper limit to the temperature at which the additives of this invention can be used, at temperatures above 80° C. the additives effect no significant increase in cis structure over that conventionally encountered.

The additives of this invention are very effective in small amounts in producing a change in structure, but succeeeding increments are less effective until saturation of the emulsion is reached at which point no additional gain is obtained by further amounts of additive. This effect is indicated by Example 1 below, which shows that little further increase in cis-content of the polymer is obtained by using more than 1 part by weight (4-millimoles) of cobalt acetylacetonate for 100 parts of butadiene, under the polymerization conditions of the example. The solubility and effectiveness of the cobalt salt with the polymerization formula and conditions is different for different cobalt salts. In general, the beneficial results of the invention are obtained by using from 0.5 to 50, preferably from 2 to 25, millimoles of cobalt salt per 100 parts by weight of butadaiene.

The additives are effective only during polymerization. Treatment of a completed latex either in the presence or the absence of free radicals with the additive does not result in increased cis structure.

The additives are effective in the presence of the various emulsifiers, initiator systems, salts and other ingredients of conventional emulsion polymerization reaction mixtures.

The structure-controlling additives of this invention are the divalent cobalt salts or double salts of betadiketones having the formula $$R-\underset{\underset{O}{\|}}{C}-CH_2-\underset{\underset{O}{\|}}{C}-R'$$

wherein the terminal groups R and R' are selected from the group consisting of saturated aliphatic, aromatic, alkaryl, and aralkyl hydrocarbon radicals. While the size of the radicals R and R' is not a critical factor in the invention, the preferred diketones are those in which R and R' are lower alkyl radicals having from 1 to 4 carbon atoms, or phenyl, lower phenalkyl, and alkylphenyl radicals having from 6 to 10 carbon atoms. These are preferred because of the lower molecular weight and because they are more readily available. Acetylacetone is an especially preferred diketone; examples of other preferred diketones are 1-phenyl-1,3-butanedione 1,3-diphenyl-1,3 propanedione. The cobaltous salts of each of these compounds acts as a structure-controlling additive.

The emulsion polymerization formulation employed in the invention may, as indicated, be based on any conventional emulsifying agent, and any conventional emulsion polymerization catalyst or initiator, and may contain, if desired, any conventional regulator, such as any of the emulsifying agents, catalysts or initiators, and regulators disclosed in Bovey, et. al., op. cit. The proportions of such ingredients, as well as the amount of water and polymerizable monomer present, may similarly be as described for example by Bovey, et. al., and in general the formulation and procedure may be in accordance with conventional practice, except for the presence of the above described divalent cobalt salts of beta-diketones.

The cobaltous salts of beta-diketones may be prepared by mixing solutions of the diketone and cobalt acetate in water or alcohol, and bringing the pH to nearly neutral, or by pouring the alcoholic mixture into a strong solution of sodium acetate. Such methods are well known, being described in the literature, see Inorganic Synthesis, W. C. Fernelius, Editor, McGraw-Hill, New York 1946, volume II, Chapter II.

The polymerization technique used in the following examples to study the effect of these additives was conventional emulsion polymerization except that, where indicated, the additives of this invention were included in the reaction mixture. A sample bottle was loaded with distilled or deionized water, emulsifier, structure-controlling additive (if used), salt and/or buffer solution, styrene (if used), and modifier. After loading the bottle was flushed with nitrogen. Then chemicals comprising the redox polymerization catalyst system were added. The bottle was chilled, loaded with butadiene, and then sealed. An initiator was added through the cap and polymerization was allowed to proceed with end-over-end shaking in a water bath at suitably controlled temperature. The progress of the reaction was followed by determining solids in the usual way. At the end of the reaction the sample was short-stopped with hydroquinone or other suitable chemical whereupon the bottle was vented. A suitable antioxidant was added, and then the latex was coagulated with salt and acetic acid to give a fine crumb. The remaining additive was removed by soaking the crumb in acetic acid or methanol or both successively. The excess additive can be removed by solvent extraction of the latex before coagulation or by any other suitable means and for some purposes it may be unnecessary to remove the additive. After removal of the additive the crumb was dried in the usual manner. The dried polymer was subjected to the usual tests to determine polymer qualities such as gel content and dilute solution viscosity. Tests were also conducted to determine polymer structure.

The structure of the polymer was determined by infrared absorption of a carbon disulfide solution of the purified polymer except in the case of insoluble polymers. Purification of the polymer dissolved in carbon disulfide was accomplished by three successive precipitations with methanol followed by redissolution in carbon disulfide. After the third precipitation and the redissolution contaminating methanol was pumped off and the pure solution was filtered through filter paper or bolting silk. The concentration of the carbon disulfide solution was adjusted to a convenient value, about 20 grams per liter, and the structure of the polymer sample was then determined by infrared spectroscopy in the usual manner, observations being made on the 937 cm.$^{-1}$ band for trans, on the 911 cm.$^{-1}$ band for vinyl and in the region of 723 cm.$^{-1}$ for cis structure. This method is indicated in the article by Hampton in Analytical Chemistry, volume 21, August 1, 1959, page 923. The percentage values of the structure were normalized that is, multiplied by 100 over the total of the percentages of the three types of structure found so that the adjusted percentage totalled 100%. All experiments using the additives were paralleled by samples not using a structure-controlling additive.

In the case of insoluble polymers, the polymer was purified by solvent extraction, ground to a small particle size, and pelletized with finely powdered potassium bromide; infrared measurements were made on the pellets in known manner (see e.g. H. Hausdorf, Applied Spectroscopy, 8, 131 (1954)).

The following examples illustrates the invention. All parts and percentages referred to are by weight unless otherwise indicated.

EXAMPLE 1

This example indicates the effect of concentration of the additive on polybutadiene structure.

Five polybutadiene samples, 1A to 1E, were prepared in the manner indicated above. A different amount of cobaltous acetyl acetonate was used for each sample: 1A, none; 1B, 0.01 part; 1C, 0.1 part; 1D, 1.0 part; 1E, 10 parts. Other ingredients were the same for each sample as follows:

|  | Parts |
|---|---|
| Distilled water | 200 |
| Potassium oleate | 5 |
| Potassium carbonate, anhydrous | 0.5 |
| MTM-4 [1] | 0.39 |
| Sodium formaldehyde sulfoxylate | 0.2 |
| Sequestrene Na$_3$ [2] | 0.042 [3] |
| FeSO$_4$.7H$_2$O | 0.028 |
| Distilled water | 9.73 |
| Butadiene | 100 |
| Diisopropylbenene hydroperoxide | 0.3 |

[1] A mixture of tertiary mercaptans, approximately 60% t-dodecyl mercaptan, 20% t-tetradecyl mercaptan, and 20% t-hexadecyl mercaptan (Troyan et al., Rubber World, vol. 121, page 68).
[2] Trisodium salt of ethylenediamine tetra-acetic acid.
[3] Indicates that materials in brackets are added as aqueous solution.

Immediately after addition of the diisopropylbenzene hydroperoxide, all sample bottles were set to rotate in a 5° C. polymerization bath. At suitable times, the samples were removed from the bath and treated with 0.1 part hydroquinone as a shortstop. It was noted that the cobaltous acetyl acetonate in 1E did not entirely dissolve. All samples were then treated with one part of antioxidant (N,N'-di-beta-napthyl-para-phenylenediamine) added as a 50% paste. All samples were coagulated with an aqueous solution of NaCl and acetic acid, and washed with water. Samples 1D and 1E were additionally soaked in dilute aqueous acetic acid, and then in methanol, for further purification. After drying, portions of the samples were further purified as described above for infrared determination of structure as carbon disulfide solutions of purified polybutadiene. The results are given in the following table:

| Sample | Parts cobaltous acetyl acetonate | Polybutadienes made at 5° C. | | |
|---|---|---|---|---|
|  |  | Percent cis | Structure, percent vinyl | Percent trans |
| 1A | 0 | 7 | 14 | 79 |
| 1B | 0.01 | 8 | 15 | 77 |
| 1C | 0.1 | 11 | 16 | 73 |
| 1D | 1.0 | 20 | 17 | 63 |
| 1E | 10.0 | 21 | 17 | 62 |

From this table it can be seen that all samples 1B through 1E show a lower percentage of trans structure and a higher percentage of cis structure than blank sample 1A. It is also evident that with increasing amounts of cobaltous acetyl acetonate the percentage of cis and trans structure in the polybutadienes formed approaches asymptotically a set of limiting values, and then amounts of cobaltous acetyl acetonate in excess of one part for the recipe given have little effect in changing the structure of the polybutadiene formed.

EXAMPLE 2

This example indicates the effect of additive on polybutadiene structure as a function of the percent of monomer converted to polymer.

Three polybutadiene samples 2A to 2C were prepared in the manner indicated above. Sample 2A contained no cobaltous salt; samples 2B and 2C each contained one part cobaltous acetyl acetonate. Other ingredients were the same for each sample as follows:

|  | Parts |
|---|---|
| Distilled water | 200 |
| Potassium oleate | 5 |
| Potassium carbonate, anhydrous | 0.3 |
| Potassium hydroxide | 0.12 |
| MTM-4 | 0.47 |
| Sodium formaldehyde sulfoxylate | 0.2 |
| Sequestrene Na$_3$ | 0.042 [1] |
| FeSO$_4$.7H$_2$O | 0.028 |
| Distilled water | 9.73 |
| Butadiene | 100 |
| Diisopropylbenzene hydroperoxide | 0.3 |

[1] See footnote 3 of Example 1.

Immediately after the addition of the diisopropyl-benzene hydroperoxide the sample bottles were set to rotate in a 5° C. polymerization bath. At times indicated in the table following, the polymerizations were shortstopped with 0.1 part hydroquinone and the bottles were vented. The samples were then treated with one part N,N'-di-beta-naphthyl-para-phenylenediamine as an antioxidant. The samples were coagulated with a salt-acid solution, and the fine crumb was washed with water. Samples 2B and 2C were treated with dilute aqueous acetic acid followed by methanol for further purification. After washing with methanol, all three samples were dried in a vacuum oven. The samples were weighed and the percentage of conversion of monomer to polymer was calculated for each sample. The samples were purified for structure analysis by infrared as indicated above. The results are given in the following table.

| Sample | Parts cobaltous acetyl acetonate | Reaction time (hours) | Percent conversion of monomer | Polybutadienes made at 5° C. Structure | | |
|---|---|---|---|---|---|---|
|  |  |  |  | Percent cis | Percent vinyl | Percent trans |
| 2A | 0 | 16 | 49 | 8 | 16 | 76 |
| 2B | 1 | 5 | 13 | 18 | 19 | 63 |
| 2C | 1 | 53 | 57 | 17 | 19 | 64 |

From the table it can be seen that the effect of cobaltous acetyl acetonate on the structure of the polybutadiene produced does not depend on the percent of the monomer converted to polymer, as 2B and 2C have similar structural analyses, although the percent conversion of monomer to polymer is quite different being 13% for sample 2B and 57% for sample 2C.

EXAMPLE 3

This example shows the effect of additive on polybutadiene structure at various polymerizing temperatures.

Sixteen polybutadiene samples 3A to 3P were prepared as indicated above. These are divided into two groups; group 3A to 3G, made without a cobaltous salt, and group 3H to 3P in which each sample corresponds to a sample in the group 3A to 3G but contains cobaltous acetyl acetonate in amounts indicated in the table below. Each group contains 3 subgroups in which polymerization was carred out at 5° C., 50° C. and 80° C. respectively. All corresponding samples were polymerized at the same temperature. This arrangement allows ready comparison of the effect of polymerization temperature on the structure of polybutadiene both with and without the additive. To clarify interpretation the average structural analysis of each subgroup is shown.

Samples 3A to 3C and 3H to 3K, polymerized at 5° C. were identical to sample 1A except samples 3H to 3K contained cobaltous acetyl acetonate in the amounts shown.

Sampel 3D polymerized at 5° C. was identical to sample 1A except that 0.5 part $K_2CO_3$ was replaced by 0.3 part $K_2CO_3$ and 0.12 part KOH to slow down the rate. Samples 3L and 3M polymerized at 5° C. correspond to sample 3D except that they contain cobaltous acetyl acetonate in the amounts shown.

Samples 3E and 3F and corresponding samples 3N and 3O all polymerized at 50° C. contained the following ingredients:

|  | Parts | | | |
|---|---|---|---|---|
|  | 3E | 3F | 3N | 3O |
| Distilled water | 200 | 200 | 200 | 200 |
| Pluronic F-68 [1] | 5 | 5 | 5 | 5 |
| MTM-4 | | 0.39 | | 0.39 |
| Tertiary octyl mercaptan | 0.4 | | 0.4 | |
| Azobisiso-butyronitrile | 1 | 1 | 1 | 1 |
| Butadiene | 100 | 100 | 100 | 100 |
| Cobaltous acetyl acetonate | | | 3 | 2 |

[1] Ethylene oxide-propylene oxide block copolymer.

Sample 3G and its corresponding sample 3P both polymerized at 80° C. contained the following ingredients:

|  | Parts | |
|---|---|---|
|  | 3G | 3P |
| Distilled water | 200 | 200 |
| "Vel" emulsifier [1] | 5 | 5 |
| MTM-4 | 0.47 | 0.47 |
| $K_2CO_3$ | 0.3 | 0.3 |
| Azobisisobutyronitrile | 1.0 | 1.0 |
| Butadiene | 100 | 100 |
| Cobaltous acetyl acetonate | | 3 |

[1] An alkyl aryl sodium sulfonate, made by Colgate-Palmolive Co.

All sixteen samples were polymerized, purified and analyzed in the manner indicated above except that the infrared spectra for structural analysis of 3G and 3P were run on solid pellets of polymer mixed with potassium bromide, in known fashion. The results are given in the following table.

| Sample | Parts cobaltous acetyl acetonate | Polybutadiens made at various temperatures | | |
|---|---|---|---|---|
|  |  | Structure | | |
|  |  | Percent cis | Percent vinyl | Percent trans |
| Polybutadiene blanks—Polymerization temperature, 5° C.: | | | | |
| 3A | 0 | 7 | 14 | 79 |
| 3B | 0 | 8 | 15 | 77 |
| 3C | 0 | 9 | 17 | 74 |
| 3D | 0 | 8 | 16 | 76 |
| Average | | 8 | 15.5 | 76.5 |
| Polymerization temperature 50° C.: | | | | |
| 3E | 0 | 15 | 18 | 67 |
| 3F | 0 | 15 | 18 | 67 |
| Average | | 15 | 18 | 67 |
| Polymerization temperature 80° C.: | | | | |
| 3G | 0 | 18 | 18 | 64 |
| Polybutadienes made with cobaltous acetyl acetonate—Polymerization temperature 5° C.: | | | | |
| 3H | 1.0 | 20 | 17 | 63 |
| 3I | 10.0 | 21 | 17 | 62 |
| 3J | 6.67 | 19 | 18 | 63 |
| 3K | 6.67 | 20 | 20 | 60 |
| 3L | 1.0 | 18 | 19 | 63 |
| 3M | 1.0 | 17 | 19 | 64 |
| Average | | 19.2 | 18.3 | 62.5 |
| Polymerization temperature 50° C.: | | | | |
| 3N | 3.0 | 17 | 19 | 64 |
| 3O | 2.0 | 17 | 19 | 64 |
| Average | | 17 | 19 | 64 |
| Polymerization temperature 80° C.: | | | | |
| 3P | 3.0 | 20 | 18 | 62 |

From inspection of the averages of the structural analysis of the polybutadienes made without a cobaltous salt it can be seen that the percentage of cis structure changes from 8% at 5° C., to 15% at 50° C., to 18% at 80° C., and that the percentage of trans structure decreases from 76.5% at 5° C., to 67% at 50° C., to 64% at 80° C. The vinyl analysis changes only slightly with temperature. These results check closely with the well known changes discussed above.

However, in the polybutadienes made in the presence of cobaltous acetyl acetonate the percentage of both the cis and trans structures are essentially constant with temperature. The constancy of the percentage of vinyl structure for polybutadienes made with cobalt acetyl acetonate is similar to that of the polybutadiene blanks.

It is evident that polybutadiene made in the presence of cobaltous acetyl acetonate has a substantially invariant proportion of cis, vinyl and trans structures over the temperature range 5° C. to 80° C. and that over this temperature range the percentage of monomer units in polybutadiene made in the presence of cobaltous acetyl acetonate having a cis configuration is from 17 to 20%.

It will be noted by comparison of samples 3H and 3I that the use of more than one part of cobaltous acetyl acetonate in the recipe given causes little or no additional change in structure.

EXAMPLE 4

This example indicates the effect of cobalt salts of various beta-diketones on the structure of polybutadiene.

Eight samples 4A to 4H were prepared in the manner indicated above. Samples 4A to 4D were identical to sample 1A except that the 0.5 part $K_2CO_3$ was replaced by 0.3 part $K_2CO_3$ and 0.12 part KOH (identical to sample 3D) and except that they contained the additive indicated in the table below. Samples 4E, 4F and 4H were identical to sample 1A except that they contained 0.12 par KOH in addition to 0.5 part $K_2CO_3$ and except that they contained the additive indicated in the table below. Sample 4G was identical to sample 1A except that it contained the additive indicated below.

The samples were polymerized at 5° C., purified, and analyzed in the manner indicated above. The results are given in the table below.

| Sample | Additive | Moles used per 100 parts of butadiene | Percent cis | Percent vinyl | Percent trans |
|---|---|---|---|---|---|
| 4A | None | | 9 | 16 | 75 |
| 4B | do | | 8 | 16 | 76 |
| 4C | do | | 9 | 16 | 75 |
| 4D | Bis(1,3 diphenyl-1,3 propanediono) cobalt. | 0.008 | 13 | 18 | 69 |
| 4E | Bis(1,phenyl-1,3-butanediono) cobalt. | 0.0117 | 18.5 | 18.5 | 63 |
| 4F | Sodium cobaltous acetyl acetonate. | 0.0117 | 18 | 19 | 63 |
| 4G | Cobaltous acetyl acetonate. | 0.0117 | 18 | 18 | 64 |
| 4H | Cobaltic acetyl acetonate. | 0.0117 | 10 | 17 | 73 |

It will be noted that the blanks 4A, 4B and 4C indicate a cis structure of 9, 8, and 9% respectively and a trans structure of 75, 76 and 75% respectively, in good agreement with each other and with prior blank samples. The additives bis(1-phenyl-1,3-butanediono) cobalt in sample 4E and sodium cobaltous acetylacetonate in sample 4F both increase the percentage of cis structure and decrease the percentage of trans structure to about the same extent as cobaltous acetyl acetonate in sample 4G. The bis(1,3-diphenyl-1,3-propanediono) cobalt in sample 4D even in a greatly reduced amount, is about half as effective as the cobaltous acetyl acetonate in sample 4G. On the other hand the cobaltic acetyl acetonate in sample 4H shows little or no tendency toward increasing cis structure.

This example shows four cobaltous salts of beta-diketones, namely cobaltous acetyl acetonate, sodium cobaltous acetyl acetonate, bis(1-phenyl-1,3-butanediono) cobalt and bis(1,3-diphenyl-1,3-propanediono) cobalt, which are effective in increasing the percentage of cis structure and decreasing the percentage of trans structure of polybutadienes made in their presence.

EXAMPLE 5

This example shows a comparison of a vulcanized rubber containing polybutadiene made at 5° C. in the presence of cobaltous acetyl acetonate with a vulcanized rubber containing polybutadiene made at 5° C. without any cobaltous salt and with a vulcanized rubber containing polybutadiene made at 50° C. without any cobaltous salt.

Three samples of polybutadiene 5A, 5B and 5C were made in the manner indicated above. The following recipes were used.

| | 5A | 5B | 5C |
|---|---|---|---|
| Cobaltous acetyl acetonate | 1 | | |
| Distilled water | 200 | 200 | 200 |
| Potassium oleate | ¹4.5 | 5 | 5 |
| Potassium carbonate | .5 | .5 | .5 |
| Potassium persulfate | | | .5 |
| MTM-4 | .56 | .37 | |
| Dodecyl mercaptan (Flush with nitrogen) | | | .76 |
| Sodium formaldehyde sulfoxylate* | .2 | .2 | |
| Trisodium salt of ethylenediaminetetraacetic acid* | .042 | .042 | |
| $FeSO_4.7H_2O$* | .028 | .028 | |
| Distilled water* | 9.73 | 9.73 | |
| Butadiene | 100 | 100 | 100 |
| (Seal) | | | |
| Diisopropylbenzene hydroperoxide | .3 | .3 | |
| Polymerization: | | | |
| Temperature, ° C | 5 | 5 | 50 |
| Time (hours) | 43 | 7 | 22 |
| Shortstop | Hydroquinone. | Hydroquinone. | ²Thiostop K |
| Antioxidant ³ | 1 | 1 | 1 |
| Coagulation | ⁴Methanol | Salt-acid | Salt-acid |
| Percent conversion of monomer to polymer | 76 | 66 | 73 |

¹ At 16½ hours an additional 2.5 parts potassium oleate (as 10% solution) was added.
² Potassium dimethyldithiocarbamate.
³ N,N'-di-beta-naphthyl-p-phenylenediamine.
⁴ Also soaked in acetic acid, soaked in methanol, washed with methanol.
*See footnote 3 of Example 1.

The product polybutadienes were tested and the following results were obtained.

| | 5A | 5B | 5C |
|---|---|---|---|
| Percent gel content | 0 | 0 | 0 |
| Dilute solution viscosity | 2.21 | 2.07 | 2.35 |
| ML-4-212° F | 51 | 49 | 52 |
| Vinyl/trans ratio (by infrared analysis) | .28 | .22 | .27 |

Then three rubber stocks 5D, 5E and 5F were prepared, containing the polybutadiene of samples 5A, 5B and 5C, respectively, mixed in carbon black stocks as follows:

| | 5D | 5E | 5F |
|---|---|---|---|
| Polybutadiene of sample 5A | 95 | | |
| Polybutadiene of sample 5B | | 100 | |
| Polybutadiene of sample 5C | | | 100 |
| Carbon black | 50 | 50 | 50 |
| Zinc oxide | 5 | 5 | 5 |
| Asphaltum | 5 | 5 | 5 |
| Stearic acid | 6.5 | 1.5 | 1.5 |
| Mercaptobenzothiazole | 1.5 | 1.5 | 1.5 |
| Diphenyl guanidine | .4 | .4 | .4 |
| Sulfur | 2 | 2 | 2 |
| | 165.4 | 165.4 | 165.4 |

Portions of these stocks were cured at 292° F. for 30 minutes, 45 minutes, and 60 minutes in a 0.1 inch mold and a portion of each was cured at 292° F. for 45 minutes in a half-inch plug mold. Various tests were made on the cured samples and the following results were obtained:

| | 5D | | | 5E | | | 5F | | |
|---|---|---|---|---|---|---|---|---|---|
| Cure time, minutes, at 292° F | 30 | 45 | 60 | 30 | 45 | 60 | 30 | 45 | 60 |
| Tensile strength, p.s.i | 1,900 | 1,775 | 1,615 | 2,300 | 2,250 | 1,610 | 1,795 | 1,855 | 1,840 |
| Elongation | 600 | 540 | 510 | 690 | 650 | 560 | 540 | 560 | 550 |
| Durometer A | 63 | 65 | 66 | 60 | 62 | 62 | 59 | 60 | 60 |
| Modulus at 200 p.s.i | 680 | 760 | 770 | 535 | 625 | 630 | 690 | 720 | 730 |
| Modulus at 300 p.s.i | 1,260 | 1,410 | 1,450 | 1,030 | 1,200 | 1,225 | 1,300 | 1,325 | 1,290 |
| Tors. hyst. at RT | .351 | .330 | .346 | .314 | .317 | .319 | .325 | .325 | .314 |
| Tors. hyst. at 280 | .187 | .195 | .200 | .191 | .183 | .189 | .172 | .181 | .183 |
| Rebound | | 47 | | | 51 | | | 47 | |
| TR 10% ° C.¹ | −70.6 | −68.7 | −67.4 | −50.7 | −57.2 | −56.6 | −69.8 | −70.2 | −68.4 |
| TR 30% ° C.¹ | −63.2 | −64.0 | −63.9 | −32 | −35.8 | −36.5 | −62.7 | −63.4 | −64.0 |
| TR 50% ° C.¹ | −54.3 | −55.3 | −55.8 | −23.2 | −25.6 | −26.9 | −51.3 | −53.2 | −54.4 |
| TR 70% ° C.¹ | −44.4 | −46.2 | −46.2 | −16.2 | −19.4 | −10.0 | −40.0 | −42.5 | −43.0 |
| Processing | Best | | | Intermediate | | | Worst | | |

¹ At 150% elongation.

It can be seen that the tensile strength, elongation, and modulus data for sample 5D, the rubber containing polybutadiene made at 5° C. in the presence of cobaltous acetyl acetonate, is more like the data for sample 5F, the rubber containing polybutadiene made at 50° C. without any cobaltous salt, than it is like the data for sample 5E, the rubber containing polybutadiene made at 5° C. without a cobaltous salt. There is a striking similarity between the freeze resistance data between samples 5D and 5F, where retraction temperatures agree within two or three degrees. On the other hand sample 5E, which has a lower percentage of cis structure than either 5D or 5F, tends to crystallize and therefore has much higher retraction temperatures. Hence, this example shows that a rubber stock containing polybutadiene made at 5° C. in the presence of cobaltous acetyl acetonate, sample 5D, has better freeze resistance than a rubber containing polybutadiene made at the same temperature, 5° C., without a cobaltous salt, sample 5E.

EXAMPLE 6

This example shows the effect of cobaltous acetyl acetonate on the structure of a copolymer of butadiene and styrene (75% butadiene, 25% styrene).

Three samples 6A, 6B and 6C of a copolymer of butadiene and styrene were made as indicated above. Sample 6A was a copolymer made at 5° C. in the presence of 1 part of cobaltous acetyl acetonate. Sample 6B was a similar copolymer made at the same temperature, 5° C., without a cobaltous salt. Sample 6C was a similar copolymer made at 50° C. without a cobaltous salt. The following recipes were used:

|  | 6A | 6B | 6C |
|---|---|---|---|
| Cobaltous acetyl acetonate | 1 | | |
| Distilled water | [1] 187.5 | 200 | 200 |
| Potassium oleate | [1] 4.5 | 5 | 5 |
| Potassium carbonate | .5 | .3 | .5 |
| Potassium hydroxide | | .12 | |
| Potassium persulfate | | | .5 |
| MTM-4 | .56 | .37 | |
| Dodecyl mercaptan | | | .47 |
| Styrene | 25 | 25 | 25 |
| (Flush with nitrogen) | | | |
| Sodium formaldehyde sulfoxylate* | .20 | .20 | |
| Trisodium salt of ethylenediaminetetraacetic acid* | .042 | .042 | |
| FeSO₄·7H₂O* | .028 | .028 | |
| Distilled water* | 9.73 | 9.73 | |
| (Chill with ice) | | | |
| Butadiene | 75 | 75 | 75 |
| (Seal) | | | |
| Diisopropylbenzene hydroperoxide | .3 | .3 | |
| Polymerization: | | | |
| Temperature, ° C | 5 | 5 | 50 |
| Time (hours:mins.) | 32:20 | 14:38 | 14:25 |
| Shortstop (on all) | .625 part potassium dimethyl dithiocarbamate | | |
| Antioxidant [2] | 1 | 1 | 1 |
| Coagulation | [3] Methanol | Methanol | Methanol |
| Percent conversion butadiene monomer to polymer | 56.6 | 55 | 72.5 |

[1] At 20% Conversion an additional 2.5 parts potassium oleate in 22.5 parts of water was added.
[2] N,N'-di-beta-naphthyl-p-phenylenediamine.
[3] Polymer was soaked in 10% by volume acetic acid, then in methanol.
*See footnote 3 of Example 1.

From 3 to 6 bottles of each sample preparation were polymerized concurrently and blended. Various tests were made on the products thus obtained. The results of these tests indicated the following properties.

|  | 6A | 6B | 6C |
|---|---|---|---|
| Percent gel content | 0 | 0 | 0 |
| Dilute solution viscosity | 3.05 | 2.45 | 1.96 |
| ML-4-212° F | 110 | 55 | 47 |
| Percent trans-structure [1] | 65.3 | 76.7 | 68.6 |
| Percent vinyl-structure [1] | 15.9 | 15.1 | 15.7 |
| Percent cis-structure [1] | 18.8 | 8.2 | 15.7 |
| Total | 100 | 100 | 100 |

[1] The structural percentage is given on the basis of the butadiene content only, so that more ready comparison can be made with the homopolymers.

From these results it can be seen that cobaltous acetyl acetonate is effective in changing the structure of butadiene in a copolymer of butadiene and styrene as well as in the homopolymer of butadiene.

EXAMPLE 7

This example shows a comparison of a vulcanized rubber containing a butadiene-styrene copolymer made at 5° C. in the presence of cobaltous acetyl acetonate with a vulcanized rubber containing a butadiene-styrene copolymer made at 5° C. without a cobaltous salt and with a vulcanized rubber containing a butadiene-styrene copolymer made at 50° C. without a cobaltous salt.

Three sample rubber stocks 7A, 7B and 7C were prepared. Samples 7A, 7B and 7C contained the butadiene-styrene copolymer of samples 6A, 6B and 6C respectively, mixed in a carbon black stock as follows:

|  | 7A | 7B | 7C |
|---|---|---|---|
| Copolymer of sample 6A | 100 | | |
| Copolymer of sample 6B | | 100 | |
| Copolymer of sample 6C | | | 100 |
| Carbon black | 50 | 50 | 50 |
| Zinc oxide | 5 | 5 | 5 |
| Asphaltum | 5 | 5 | 5 |
| Stearic acid | 6.5 | 6.5 | 6.5 |
| Mercaptobenzothiazole | 1.5 | 1.5 | 1.5 |
| Diphenyl guanidine | .4 | .4 | .4 |
| Sulfur | 2 | 2 | 2 |

Portions of these stocks were cured at 292° F. for 30 minutes, 45 minutes, and 60 minutes. Various tests were made on the cured samples and the following results were obtained:

|  | 7A | | | 7B | | | 7C | | |
|---|---|---|---|---|---|---|---|---|---|
| Cure time, minutes, at 292° F | 30 | 45 | 60 | 30 | 45 | 60 | 30 | 45 | 60 |
| Durometer A | 66 | 68 | 68 | 65 | 66 | 67 | 62 | 64 | 68 |
| Scott tensile, p.s.i | 2,930 | 3,020 | 2,620 | 3,630 | 3,570 | 3,840 | 3,170 | 2,710 | 3,120 |
| Scott elongation | 430 | 380 | 350 | 600 | 530 | 540 | 560 | 470 | 500 |
| Modulus at 200 p.s.i | 850 | 975 | 990 | 590 | 695 | 570 | 615 | 690 | 560 |
| Modulus at 300 p.s.i | 1,490 | 1,820 | 1,860 | 1,050 | 1,250 | 1,010 | 1,115 | 1,290 | 1,050 |
| Tors. hyst. at RT | .31 | .30 | .30 | .35 | .33 | .34 | .35 | .33 | .33 |
| Tors. Hyst., 280° F | .15 | .12 | .13 | .17 | .16 | .16 | .15 | .15 | .15 |
| Rebound | | 46 | | | 46 | | | 41 | |
| Temperature retraction test (measured at 150%): | | | | | | | | | |
| TR 10%, ° C | −53.1 | −51.8 | −51.7 | −48.6 | −48.4 | −47.8 | −51.0 | −50.5 | −49.6 |
| TR 30%, ° C | −47.5 | −46.6 | −46.6 | −42.9 | −42.9 | −42.1 | −44.9 | −44.7 | −44.2 |
| TR 50%, ° C | −42.1 | −41.3 | −41.1 | −37.4 | −37.7 | −36.6 | −40.0 | −38.7 | −38.4 |
| TR 70%, ° C | −34.5 | −33.8 | −33.5 | −30.2 | −30.3 | −29.3 | −31.7 | −31.2 | −31.3 |
| Processing | Worst (Mooney too high) | | | Best | | | Next best | | |

Although sample 7A rubber was made to an excessive Mooney viscosity value (which can be seen from the processing characteristics, the stiff modulus at 300%, and the short stretch in sample 7A) it is superior in freeze resistance to both sample 7B, rubber containing copolymer made at 5° C. without cobaltous salt, and sample 7C, rubber containing copolymer made at 50° C. without cobaltous salt. The improvement in freeze resistance of sample 7A over sample 7B is about 4 to 5 degrees F., and over sample 7C is about 2 degrees F.

Thus it can be seen that the effect of cobaltous acetyl acetonate in polybutadiene made at 5° C. to enhance its freeze resistance over that of polybutadiene made at 5° C. without cobaltous salts, is also encountered in a copolymer of butadiene where the butadiene is diluted as much as 25% with another monomer such as styrene.

Having thus described my invention, what I claim and desire to protect by Letters Patent is:

1. The method which comprises polymerizing 100 parts by weight of a material selected from the group consisting of 1,3-butadiene hydrocarbons and mixtures of 1,3-butadiene hydrocarbons with styrene in aqueous emulsion at temperatures ranging from 0° C. to 50° C. in the presence of from 0.5 to 50 millimoles of divalent cobalt salts of beta-diketones having the structure ROC—$CH_2$—COR' in which R and R' are selected from the group consisting of saturated aliphatic and aromatic hydrocarbon radicals.

2. The method which comprises polymerizing 100 parts by weight of a material selected from the group consisting of 1,3-butadiene hydrocarbons and mixtures of 1,3-butadiene hydrocarbons with styrene in aqueous emulsion at temperatures ranging from 0° C. to 50° C. in the presence of from 0.5 to 50 millimoles of divalent cobalt salts of beta-diketones having the structure ROC—$CH_2$—COR' in which R and R' are selected from the group consisting of saturated aliphatic and aromatic hydrocarbon radicals, whereby the percentage of cis oriented butadiene monomer units in the diene portion of the molecular chain of the polymer so formed is higher than is found in the absence of the said divalent cobalt salts of beta-diketones.

3. The method of claim 1 wherein both said radical R and said radical R' are unsubstituted aliphatic hydrocarbon radicals.

4. The method of claim 1 wherein both said radical R and said radical R' are unsubstituted aromatic hydrocarbon radicals.

5. The method of claim 1 wherein said radical R is an unsubstituted aliphatic hydrocarbon radical and said radical R' is an unsubstituted aromatic hydrocarbon radical.

6. The method of claim 1 wherein said divalent cobalt salt of a beta-diketone is cobaltous acetylacetonate.

7. The method of claim 1 wherein said divalent cobalt salt of a beta-diketone is sodium cobaltous acetylacetonate.

8. The method of claim 1 wherein said divalent cobalt salt of a beta-diketone is bis(1-phenyl-1,3-butanediono) cobalt.

9. The method of claim 1 wherein said divalent cobalt salt of a beta-diketone is bis(1,3-diphenyl-1,3-propanediono) cobalt.

10. The method of claim 1 wherein said material is 1,3-butadiene.

11. The method of claim 1 wherein said material is a mixture of 1,3-butadiene and styrene.

12. The method which comprises polymerizing material selected from the group consisting of 1,3-butadiene hydrocarbons and mixtures of 1,3-butadiene hydrocarbons with styrene in aqueous emulsion at temperatures ranging from 0° C. to 50° C. in the presence of from 0.5 to 50 millimoles, per 100 parts by weight of said material, of divalent cobalt salts of beta diketones having the structure ROC—$CH_2$—COR' in which R and R' are selected from the group consisting of saturated aliphatic and aromatic hydrocarbon radicals, whereby the percentage of cis oriented butadiene monomer units in the diene portion of the molecular chain of the polymer formed is at least 17%.

References Cited by the Examiner

UNITED STATES PATENTS

| | | | |
|---|---|---|---|
| 2,380,617 | 7/1945 | Stewart et al. | 260—94.3 XR |
| 2,834,760 | 5/1958 | Orr et al. | 260—94.3 XR |
| 2,977,349 | 3/1961 | Brockway et al. | 260—94.3 |

JOSEPH L. SCHOFER, *Primary Examiner.*

LEON J. BERCOVITZ, *Examiner.*